US007039239B2

(12) United States Patent
Loui et al.

(10) Patent No.: US 7,039,239 B2
(45) Date of Patent: May 2, 2006

(54) METHOD FOR IMAGE REGION CLASSIFICATION USING UNSUPERVISED AND SUPERVISED LEARNING

(75) Inventors: Alexander C. Loui, Penfield, NY (US); Sanjiv Kumar, Pittsburgh, PA (US)

(73) Assignee: Eastman Kodak Company, Rochester, NY (US)

( * ) Notice: Subject to any disclaimer, the term of this patent is extended or adjusted under 35 U.S.C. 154(b) by 890 days.

(21) Appl. No.: 10/072,756

(22) Filed: Feb. 7, 2002

(65) Prior Publication Data

US 2003/0147558 A1    Aug. 7, 2003

(51) Int. Cl.
    *G06K 9/62* (2006.01)
(52) U.S. Cl. ........................ 382/225; 382/228
(58) Field of Classification Search ................ 382/159, 382/224, 225, 228; 706/20
    See application file for complete search history.

(56) References Cited

U.S. PATENT DOCUMENTS

| 5,548,697 | A | * | 8/1996 | Zortea | ............................ | 706/2 |
| 5,675,710 | A |   | 10/1997 | Lewis | ........................... | 706/12 |
| 5,754,676 | A |   | 5/1998 | Komiya et al. | ............. | 382/132 |
| 5,787,194 | A |   | 7/1998 | Yair | ............................. | 382/173 |
| 6,226,408 | B1 | * | 5/2001 | Sirosh | ......................... | 382/224 |
| 6,763,303 | B1 | * | 7/2004 | Chakraborty et al. | .......... | 702/2 |
| 6,892,193 | B1 | * | 5/2005 | Bolle et al. | .................... | 706/20 |

OTHER PUBLICATIONS

Derksen, et al. "Using Landsat Thematic Mapper Imagery to Support Salmon Restoration Efforts in a Large Pacific Coast Watershed", pp. 1-21, Humboldt State University, 1996.*
Yang, et al. "Learning approaches for detecting and tracking news events", pp. 39-43, IEEE, 1999.*
Tarassenko, et al "Supervised and unsupervised learning in radial basis function classifiers", IEEE, pp. 210-216, 1994.*
Greenspan, et al. "Texture analysis via unsupervised and supervised learning", IEEE, pp. 639-644, 1991.*

(Continued)

*Primary Examiner*—Daniel Mariam
(74) *Attorney, Agent, or Firm*—David M. Woods

(57) ABSTRACT

A method for classification of image regions by probabilistic merging of a class probability map and a cluster probability map includes the steps of a) extracting one or more features from an input image composed of image pixels; b) performing unsupervised learning based on the extracted features to obtain a cluster probability map of the image pixels; c) performing supervised learning based on the extracted features to obtain a class probability map of the image pixels; and d) combining the cluster probability map from unsupervised learning and the class probability map from supervised learning to generate a modified class probability map to determine the semantic class of the image regions. In one embodiment the extracted features include color and textual features.

25 Claims, 10 Drawing Sheets

OTHER PUBLICATIONS

Lee, et al. "Supervised fuzzy art: training of neural network for pattern classification via combining supervised and unsupervised learning", IEEE, pp. 323-328, 1993.*

"Texture Features for Browsing and Retrieval of Image Data" by B.S. Manjunath and W.Y. Ma. IEEE Transactions on Pattern Analysis and Machine Intelligence, vol. 18, No. 8, Aug. 1996, pp. 837-842.

"Region-Based Image Querying" by C. Carson, S. Belongie, H. Grennspan, and J. Malik. CVPR '97, Workshop on Content-Based Access of Image and Video Libraries, pp. 42-49.

"A General Framework for Low Level Vision" by Nir Sochen, Ron Kimmel, and Ravikanth Malladi. IEEE Trans. on Image Processing, vol. 7, No. 3, Mar. 1998, pp. 310-318.

"Modeling by Shortest Data Description" by J. Rissanen. Automatica, vol. 14, 1978, pp. 465-471.

"Model Selection and the Principle of Minimum Description Length" by M.H. Hansen, and B. Yu. JASA, vol. 96, No. 454, pp. 746-774.

"Maximum Likelihood from Incomplete Data Via the EM Algorithm" by A. Dempster, N. Laird, and D. Rubin. J. Royal Statistical Soc., Ser. B, vol. 39, No. 1, pp. 1-38, 1977.

* cited by examiner

Fig. 7 (a) j = 1
Fig. 7 (b) j = 2
Fig. 7 (c) j = 3

Fig. 7  (d) j = 4
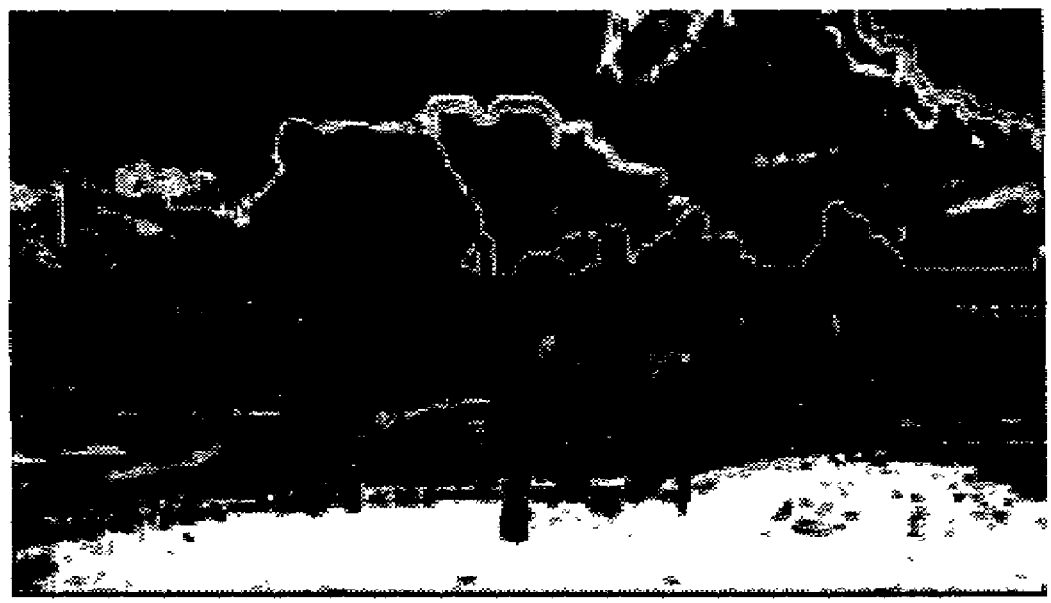
Fig. 7  (e) j = 5

METHOD FOR IMAGE REGION CLASSIFICATION USING UNSUPERVISED AND SUPERVISED LEARNING

FIELD OF THE INVENTION

The invention relates generally to the processing and classification of images, and in particular to the semantic classification of image regions.

BACKGROUND OF THE INVENTION

With the increasing use of digital imaging in general consumer applications, efficient management and organization of the image data has become important. The number of images even in a personal collection of a typical consumer can be fairly large. The concept of Auto-Albuming is a key step towards reducing the cost, time and efforts in organizing such large image databases. In particular, a semi-automatic event-clustering scheme may be used to sort a set of pictures into different groups, where each group contains similar pictures. Such schemes work on spatial color distribution and use process-intensive merging algorithms to group similar images together. However, such algorithms do not tell anything about the semantic class (e.g., beach, birthday party, swimming pool, etc.) to which each of these groups belongs. Thus, the next step needed for the automation of the albuming process is to find the semantic classification of the event contained in a group of 'similar' pictures.

After going through a large database of consumer pictures, it was observed that a majority of the groups of 'similar' images comes from the following classes: baby pictures, wedding party, birthday party, convocation, picnic, landscape, city pictures, beach, swimming pool and ocean view. Of course, the list is neither exhaustive nor mutually exclusive, i.e., there ordinarily are several pictures which may be classified under more than one event. In addition, the classification, in some cases, may be subjective. Hence, the task of event classification for very generic scenes is a very difficult problem. It requires not only the knowledge of the image regions or objects but also the semantic information contained in their emotional and spatial arrangement. Considering the state of the art research in computer vision, solving this problem is an enormous task. However, classification of the images belonging to most of the natural outdoor scenes, e.g., landscape, beach, swimming pool, garden, ocean view, etc. is mostly based on a few 'natural' regions in the image. Examples of these natural regions include water, sky, grass, sand, skin, etc. Although these regions show wide variations in their appearances, they can be captured to a certain extent by using simple features such as color, texture, shape, etc. While the present work deals only with the natural scene images, the proposed scheme can be modified to incorporate more high-level features, e.g., face location, etc., to widen its scope.

The main motivation for the present invention comes from the paradox of scene (or event) classification. In absence of any a-priori information, the scene classification task requires the knowledge of regions and objects contained in the image. On the other hand, it is increasingly being recognized in vision community that context information is necessary for reliable extraction of knowledge of the image regions and objects.

It would be useful to be able to represent the semantic classification of each pixel in an image. A deterministic approach would entail the reclassification of image regions from the beginning, and it is not very clear how one would be able to encode the context information efficiently in a deterministic framework. However, instead of employing a deterministic model and, e.g., assigning each pixel to one of the classes in a recognition vocabulary, a probabilistic framework would seem to offer more promise. What is needed is a technique that would effectively generate a class probability over the input image, which would represent the probability of each pixel having come from a given class.

SUMMARY OF THE INVENTION

The present invention is directed to overcoming one or more of the problems set forth above. Briefly summarized, according to one aspect of the present invention, the invention resides in a method for classification of image regions by probabilistic merging of a class probability map and a cluster probability map. The method includes the steps of a) extracting one or more features from an input image composed of image pixels; b) performing unsupervised learning based on the extracted features to obtain a cluster probability map of the image pixels; c) performing supervised learning based on the extracted features to obtain a class probability map of the image pixels; and d) combining the cluster probability map from unsupervised learning and the class probability map from supervised learning to generate a modified class probability map to determine the semantic class of the image regions. In one embodiment the extracted features include color and textual features.

The invention employs an iterative feedback scheme. At first, image regions are classified in different semantic natural classes. Then, multiple hypotheses are generated about the scene using the classified regions. The scene hypotheses, in turn, allow generation of context information. The scene contexts are used to further refine the classification of image regions. Under this paradigm, an obvious choice of region classification scheme is one that allows easy modification of initial classification without classifying the regions afresh. Probabilistic classification of regions can provide great flexibility in future refinement using Bayesian approach as the context information can be encoded as improved priors.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIGS. 7(a)–(e) show cluster probability maps for different clusters of the input image shown in FIG. 2.

DETAILED DESCRIPTION OF THE INVENTION

Because image processing systems employing classification of images are well known, the present description will be directed in particular to attributes forming part of, or cooperating more directly with, the method in accordance with the present invention. Attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method as described according to the invention in the following materials, software not specifically shown, suggested or described herein that is useful for implementation of the invention is conventional and within the ordinary skill in such arts.

If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
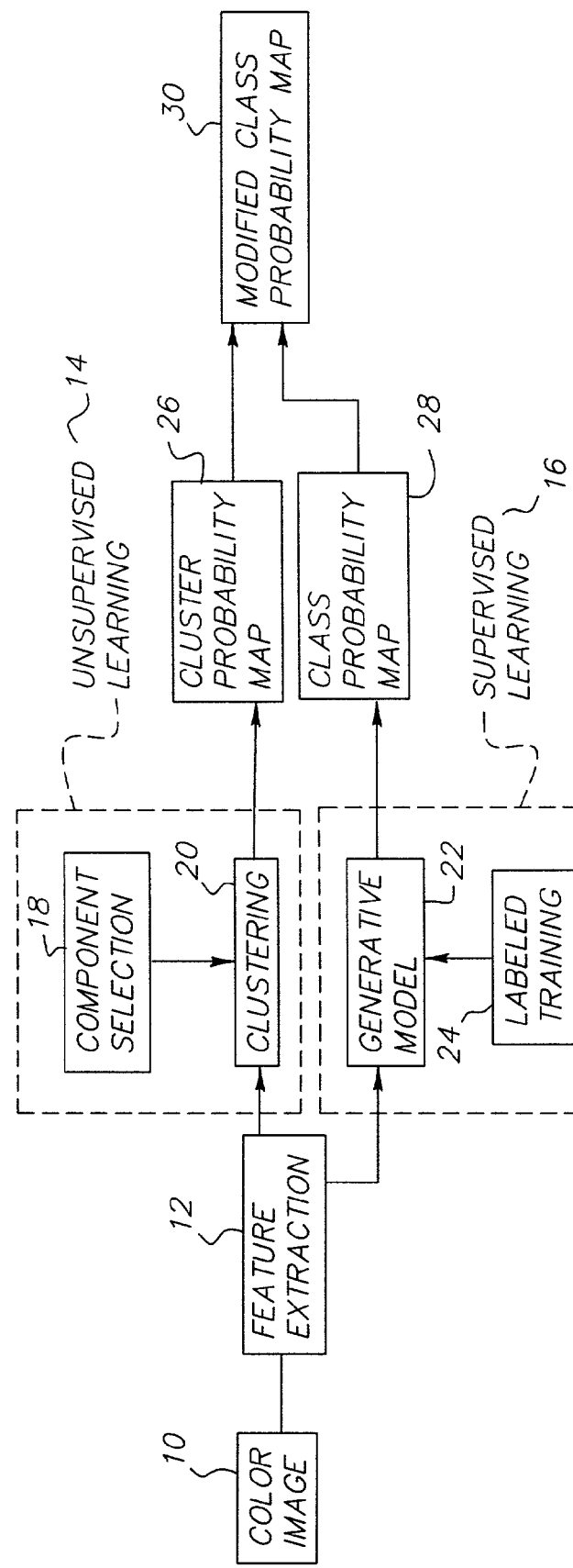
FIG. 1 is a block diagram of a technique for probabilistic classification of image regions according to the invention.

The preferred technique for probabilistic classification of image regions is shown in FIG. 1. The main aim of this technique is to find a class probability map over the input image representing the probability of each pixel to have come from a given class. As the first step, several features are extracted in a feature extraction stage 12 from an input color image 10. This step is key to the future processing of the image 10 since the image is now represented by these features. The nature of these features may vary according to their interpretational power from low level feature information such as color, texture, shapes, wavelet coefficients, etc. to higher, semantic-level feature information such as location of faces, people, structure, etc. The type of features to be extracted from an image depends on the nature of the scene classification task. For instance, if the scene is to be classified as a wedding party, there would be more interest in high level information such as the location of faces, people, the color distribution of dresses worn by the people, etc. As stated earlier, low-level features reveal good representational power for the region classification of natural scenes, which are the scenes of interest for the current embodiment of the invention. Most common techniques are either based on maximization of mutual information or some sort of statistical test of dependence between the classes and the features. Features that show high mutual information or dependence are chosen as good features.

Once the features have been extracted and selected, the next step is to use stages 14 and 16 of unsupervised and supervised learning, respectively, to obtain cluster and class probability maps 26 and 28, respectively. The main reason for using both learning techniques is that unsupervised learning 14 (which herein includes, without limitation, clustering) selects how many clusters there are in the image (in a component selection stage 18) and employs a clustering algorithm 20 to cluster the similar pixels in distinct groups, but does not account for semantic similarity between the pixels while clustering. Pixels belonging to different classes may get clustered in the same group depending on the composition of pixel data in the feature space. On the other hand, the supervised learning 16 employs a generative model 22 to predict the semantic similarity of each pixel with the class data, but does not enforce the regional similarity between pixels to obtain a better hypothesis. In addition, the supervised learning 16 is based on labeled class training data 24 that may include wide variations in pixel appearances due to different physical conditions, e.g., sharp illumination changes. This usually leads to several false positives in classification. Neither of the learning schemes is perfect. But this observation reveals the potential of merging the two learning paradigms to obtain a better, modified class probability map(s) 30. This can be done by enforcing the pixel similarity in the input image considered by clustering on the probabilistic classification results obtained by the supervised learning. Both the learning techniques and their merger will be discussed in detail in later sections.

Color Features

Color is an important component of the natural scene classes. Color based features are particularly desirable for reliable classification of image regions. To extract the color features, the color must be represented in a suitable space. Numerous color spaces which encode color information effectively have been reported in the literature. For the preferred embodiment, five conventional color spaces were tested: HSV, rectangular HSV, generalized RGB (g-RGB or rg), RGB ratio (r-RGB) and LST (an equivalent of Luv). A suitable color space must:

Provide enough similarity between the pixels belonging to the same class.

Provide enough discrimination between the pixels belonging to different classes.

Be able to factor out the variations of illuminant brightness effectively.

HSV space has good power for separating chrominance and luminance channels so as to factor out the effects of luminance. However, the problem with this space is that perceptually equal change in hue is not equivalent to equal change in saturation. For a given color in HSV space (h,s,v), rectangular HSV coordinates are given by ( sv cos(2πh) , sv sin(2πh), v). This encoding utilizes the fact that hue differences are meaningless for very small saturations. However, this encoding scheme ignores the fact that for large values and saturations, hue differences are more perceptually relevant than saturation and value differences. Generalized RGB (g-RGB) and RGB ratio (r-RGB) spaces tend to normalize the effects of luminance. The g-RGB space is given by two coordinates, $$\left(r = \frac{R}{R+G+B}, g = \frac{G}{R+G+B}\right)$$

where (R,G,B) are the coordinates in the RGB space. It is clear that one degree of freedom is lost in this conversion since the third coordinate of this space is simply (1−r−g). In the r-RGB space the coordinates are given by $$\left(g=\frac{G}{R}, b=\frac{B}{R}\right).$$

As in g-RGB space, here also one degree of freedom is lost. This loss of one degree of freedom is true for almost all color spaces, which either normalize or dispense with the luminance information. The last space, LST color space, is a variant of CIE Luv color space. This space is reported to be close to human perception of color.

Figure 2:
FIG. 2 shows an input image.
Figure 3:
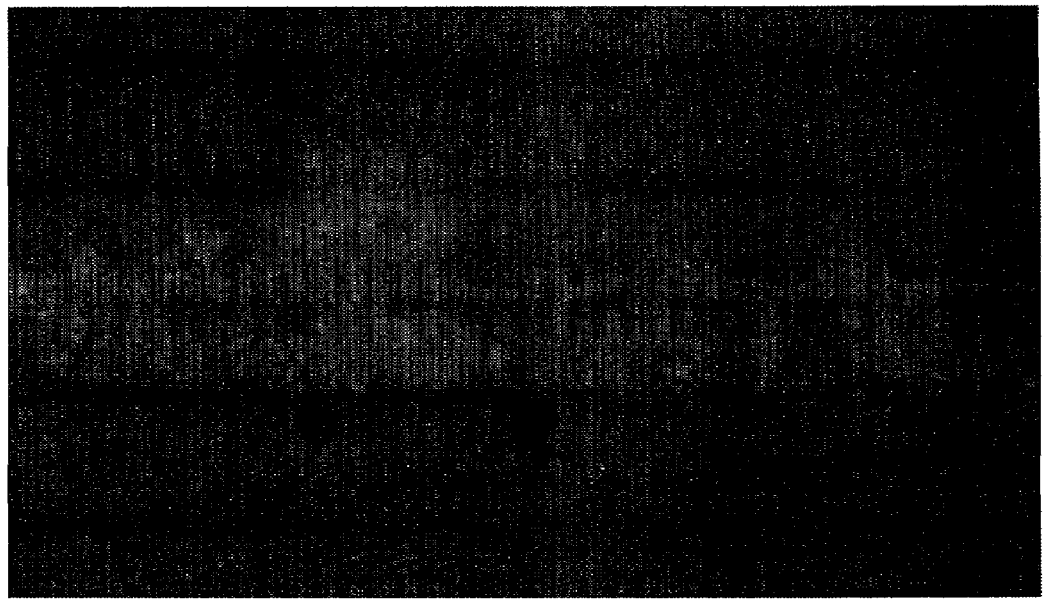
FIG. 3 shows the input image from FIG. 2 in g-RGB space.

All the above spaces inherently assume that the luminance signal is independent of the chrominance signals. However there exist a few experiments which support the evidence that for several colors, change in hue is related to the change in luminance. For further details, a thorough review of various color models has been presented in R. B. Norman, *Electronic Color*, VanNostrand Reinhold Press, 1990. In the present embodiment, the results with the last four spaces, i.e., rectangular HSV, g-RGB, r-RGB and LST, were found to be fairly similar. g-RGB space is chosen as it shows good luminance normalization and all the coordinates vary between 0 to 1, making it attractive for further mathematical computations. An input image is given in FIG. 2. The corresponding image in g-RGB space is shown in FIG. 3.

Texture Features

In contrast to color, texture is a not a point property. Instead, it is defined over a spatial neighborhood. Even though analysis of texture started decades ago, there is still no universally accepted definition of texture. According to a general notion of texture, however, texture can provide good discrimination between natural classes that resemble each other in color domain, e.g., water and sky. However, texture should be dealt with more care, as any single class does not have a unique texture. Within a semantically coherent region, there might be areas of high or low textures, with different scales and directional uniformity. Textural details can be used in a strict manner to discriminate between textural patterns as given in Brodatz Album (P. Brodatz: *Textures: A Photographic Album for Artists and Designers*, Dover Publications, New York, 1966). But in the classification task, a very strong texture measure can sometimes undo the good work done by color features.

Several techniques have been reported in the literature to compute the texture in a pixel neighborhood. The famous ones include Multiresolution Simultaneous Autoregressive (MSAR) model, Gabor Wavelets and the Second Moment Eigenstructure (SME). It has been shown by Manjunath et al. in "Texture Features for Browsing and Retrieval of Image Data", *IEEE Trans. Pattern Analysis Machine Intelligence*, vol. 18, No. 8, 1996, which is incorporated herein by reference, that multiresolution Gabor wavelets are faster and provide slightly better results than the MSAR model. Also, Gabor wavelets can be computed at varying resolutions and orientations which makes it a strong texture measure. There are two main problems while using Gabor wavelets: (a) use of a strong texture measure sometimes interferes with the functioning of the color features, and (b) Gabor wavelets are effective when used at multiple scales and orientations, which leads to an increase in the dimensions of the feature space. With this, the chances of the non-linear optimization techniques, used in learning, to get stuck in local extremum also increase. A result related to unsupervised clustering with Gabor features will be shown later.

The Second Moment Eigenstructure (SME) yields a slightly weaker measure of texture than the other methods discussed above, but it captures the essential neighborhood characteristics of a pixel. (The SME is described in Carson C., Belongie S., Grennspan H., and Malik J., "Region-Based Image Querying", CVPR '97, *Workshop on Content-Based Access of Image and Video Libraries,* 1997 and Sochen N., Kimmel R., and Malladi R., "A General Framework for Low Level Vision', *IEEE Trans. on Image Processing,* 1999, which are incorporated herein by reference.) The second moment matrix is given as:

$$\text{Second Moment Matrix} = \begin{bmatrix} \sum_c \sum_W I_x^{c2} & \sum_c \sum_W I_x^c I_y^c \\ \sum_c \sum_W I_x^c I_y^c & \sum_c \sum_W I_y^{c2} \end{bmatrix} \quad \text{(Eq. 1)}$$

where $I_k^c$ is the gradient of the image in spatial direction k over the color channel c for k=x, y, and c=R, G, B. W is the window over which these gradients are summed. Gaussian weighting is used in window W around the pixel of interest to give more weight to pixels near it. Also, the spatial derivatives are computed using 1D derivative of Gaussians in x and y directions. The texture from SME is called 'colorized texture' because the above matrix captures the texture in color space instead of usual gray level, or intensity, space. The second moment matrix can be shown as a modification of bilinear, symmetric positive definite metric defined over the 2D image manifold embedded in a 5D space of (R, G, B, x, y) (see the aforementioned article by Sochen et al.). The eigenstructure of the second moment matrix represents the textural properties. Two measures have been defined (see the aforementioned article by Carson et al.) using the eigenvalues of the matrix, (a) anisotropy=$1-\lambda_2/\lambda_1$, and (b) normalized strength=$2\sqrt{(\lambda_1+\lambda_2)}$, where $\lambda_1$ and $\lambda_2$ are the two eigen values of matrix given in equation (1) and $\lambda_1 > \lambda_2$. In the present embodiment of the invention, the combination of anisotropy and the strength is used as the texture measure. It is called 'texture strength' (S), where S=anisotropy x normalized strength.

Figure 4:
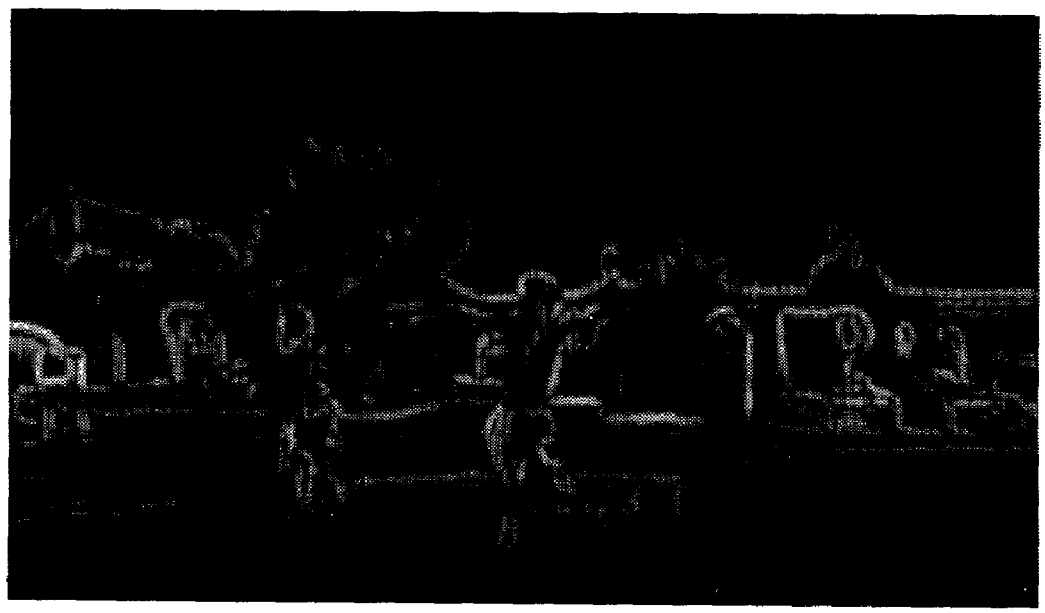
FIG. 4 shows the texture strength for the input image from FIG. 2.

The texture strength S for the original color image (FIG. 2) is given in FIG. 4. Higher brightness implies higher textural strength. Texture strength captures the textural variations in the image well except on the edges as it tends to give more weight to edges.

Unsupervised Learning

Unsupervised learning refers to learning the similarities in the data without using any labeled training set. Presently, unsupervised learning has used a clustering procedure 20. Clustering has been used here to perform exploratory data analysis thereby to gain an insight into the structure of the data belonging to the input image. This results in groups of patterns whose members are more similar to each other than they are to other patterns. Thus, unsupervised learning enforces the idea of similarity in the observed data without relying on any training set.

As true with the well known clustering procedures, the data belonging to various clusters is assumed to follow a known probability distribution, and learning therefore amounts to estimating the parameters of this distribution. However, the present embodiment takes a slight deviation from the way clustering is interpreted in a traditional sense. Instead of assigning each image pixel to a particular cluster, the present embodiment assigns a probability of association to each pixel with a particular cluster. This is called 'soft' or probabilistic clustering. In this embodiment of the invention, unsupervised learning 14 was intended to refine the results obtained from the supervised learning 16 by enforcing the pixel similarities in a given image. The 'soft' paradigm can be readily incorporated in a Bayesian approach for this purpose. In fact, it can be shown that all the 'hard' or deterministic clustering schemes are special cases of 'soft' clustering where a decision is made to assign a pixel to a particular cluster on the basis of some hypothesis, e.g., Maximum A Posteriori (MAP). To understand the flaw in 'hard' clustering, consider the MAP scheme applied to the following example. According to MAP, a pixel is assigned to that cluster for which posterior probability of the cluster given a pixel is highest. In a two-cluster case, for a certain pixel, if the posterior of the first cluster is 0.51 while for the other it is 0.49, MAP will assign the pixel to the first cluster even though intuitively it is really hard to predict concretely anything about the pixel cluster association. The difference of posteriors might be just due to some statistically insignificant or irrelevant factors.

The present embodiment assumes that the underlying clusters are normally distributed. A weak justification of this assumption comes from the central limit theorem and strong law of large numbers. As per the above assumption, the image data follows a mixture of Gaussian distribution. According to this, the density of the observed data can be given by, $$p(x) = \sum_{j=1}^{K} p(x/j)P(j) \quad \text{(Eq. 2)}$$

where x is the pixel data, K is the number of clusters (or components). As per this model, each data point is generated by first choosing a cluster with probability P(j) and then generating the data point with probability p(x/j) which is a gaussian (by assumption), i.e, $$p(x/j) = \frac{1}{|2\pi C_j|^{1/2}} \exp\left\{-\frac{1}{2}(x-\mu_j)^T C_j^{-1}(x-\mu_j)\right\} \quad \text{(Eq. 3)}$$

where $\mu_j$ is the mean and $C_j$ is the covariance matrix of cluster j. There are two main issues to be addressed while learning the density given in equation (2), i.e., How many clusters are there in the given image (the component selection stage 18).

What are the density parameters: mixing parameters P(j), mean and covariance matrix of each gaussian (parameter estimation).

Component Selection

In the absence of dogmatic priors, most of the parameter estimation techniques maximize the likelihood of the observed data. These are known as Maximum Likelihood (ML) techniques. However, the component selection is an ideal example of a problem where the ML approach fails. The reason of failure is that as the number of components increases in the mixture model, the likelihood of data always increases. Thus, in the limit, we will have one component for each data point of the observed data.

Several approaches have been proposed under the topic of model selection to overcome this problem. A widely used technique is Minimum Description Length (MDL) proposed by Rissanen (Rissanen, J., "Modeling by Shortest Data Description", *Automatica*, vol. 14, p. 465–471, 1978, which is incorporated herein by reference). In MDL, while maximizing the data likelihood, a penalty is imposed as the number of parameters increases. The description length (DL) is given as:

$$DL = -\log p(X/\theta) + (l/2)\log n \quad \text{(Eq. 4)}$$

where X is the overall observed data, θ is the parameter vector containing all the model parameters, l is the number of parameters and n is the data size. The first term in the RHS of equation (4) is the negative of log likelihood (i.e., code length of likelihood) and second term is code length of the parameters, which acts as a penalty term as the number of parameters increases. Each parameter requires a code length proportional to (½) log n, which is the precision with which they can be encoded (where estimation precision is measured by the estimation error standard deviation) (see Hansen, M. H., and Yu, B., "Model Selection and the Principle of Minimum Description Length", *JASA*, Vol. 96, No. 454, pp. 746–774, which is incorporated herein by reference). The number of components in the mixture model is chosen by minimizing the DL. However, there are two limitations while implementing this criterion. First, MDL needs iterative schemes to compute the likelihood which is prone to getting stuck in local extrema, and second, the iterative schemes are fairly slow and become almost impractical for online unsupervised learning. Thus, we use a Kullback-Leibler Divergence based method, which is described in Bishop, C. M., *Neural Networks for Pattern Recognition*, Oxford University Press, 1995, to estimate the number of components in the image.

Kullback-Leibler Divergence (KLD) is used for comparing two densities.

$$KLD = \int \tilde{p}(x) \log \frac{p(x)}{\tilde{p}(x)} dx \quad \text{(Eq. 5)}$$

where x is the data, $\tilde{p}(x)$ is the true density and p(x) is the model density. It can be shown that KLD≧0 with equality if and only if the two density functions are equal. KLD is not a symmetric function (hence not a metric). This is reasonable since it is more important for the model distribution p(x) to be close to the true distribution $\tilde{p}(x)$ in regions where data is more likely to be found.

To apply the KLD in the component selection process, the model density is given by the mixture of Gaussian in equation (2) but the true density is not known. The color histogram is assumed to be representative of the true density. This assumption is reasonable if the image is composed of smooth and homogeneous regions, as is the case with natural scene images. Also, it is necessary to learn the model density without explicitly computing the parameters by maximizing the likelihood. This is done by incrementally fitting Gaussians on the modes of the color histogram. A Laplacian method can yield a good normal approximation of the non-normal densities (see Tanner, M. A., *Tools for Statistical Inference*, 3$^{rd}$ Ed., Springer-Verlag, Inc. 1996). As per this method, parameters of a Gaussian are obtained by matching the curvature of the Gaussian with that of the original density at the mode. This is equivalent to using the negative of the inverse of the Hessian matrix at the mode of original density as the covariance matrix of the Gaussian. While this technique may be implemented by computing the Hessian matrix using Singular Value Decomposition (SVD) on the local neighborhood of the mode of the histogram, most of the Hessians obtained using this approach were found to be almost singular because color histograms usually show sharp discontinuities at the modes. Thus, a simpler approach was implemented by assuming the covariance matrices to be scalar multiples of the identity matrix. The peak of the Gaussian was matched with the peak of the histogram at the mode. The scalar multiple was computed using the property that a proper density should integrate to 1. As per this, if the height of the histogram at a given mode is $h_m$, and the covariance matrix C is given as, $C=\sigma I$, where I is the identity matrix and $\sigma$ is a constant, then $$h_m = \frac{1}{2\pi |C|^{1/2}} \text{ or } \sigma = \frac{1}{2\pi h_m} \quad \text{(Eq. 6)}$$

Figure 5:
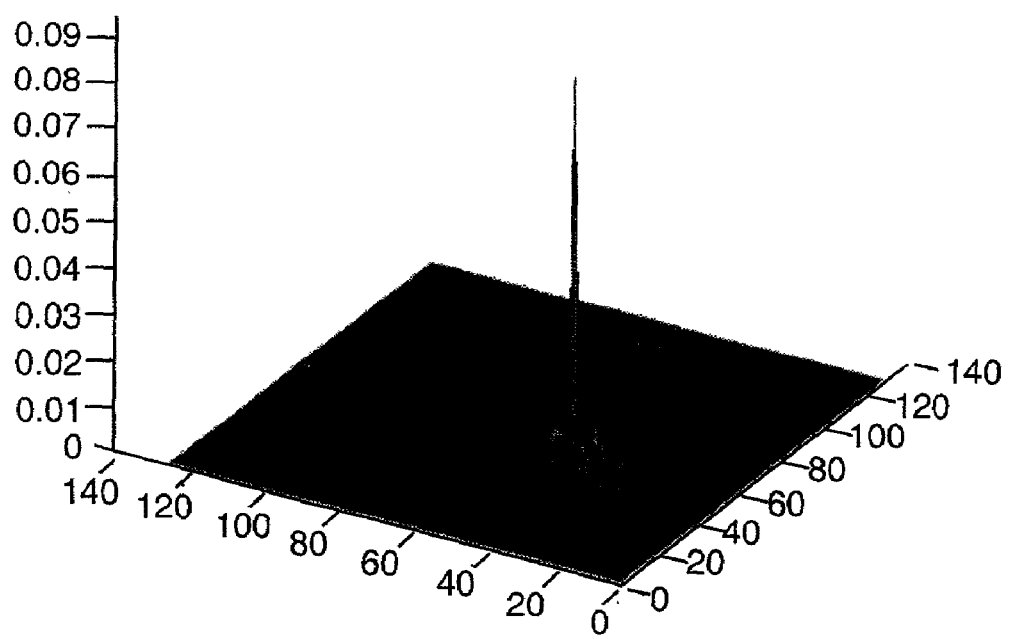
FIG. 5 shows the color histogram in g-RGB space for the input image from FIG. 2.
Figure 6:
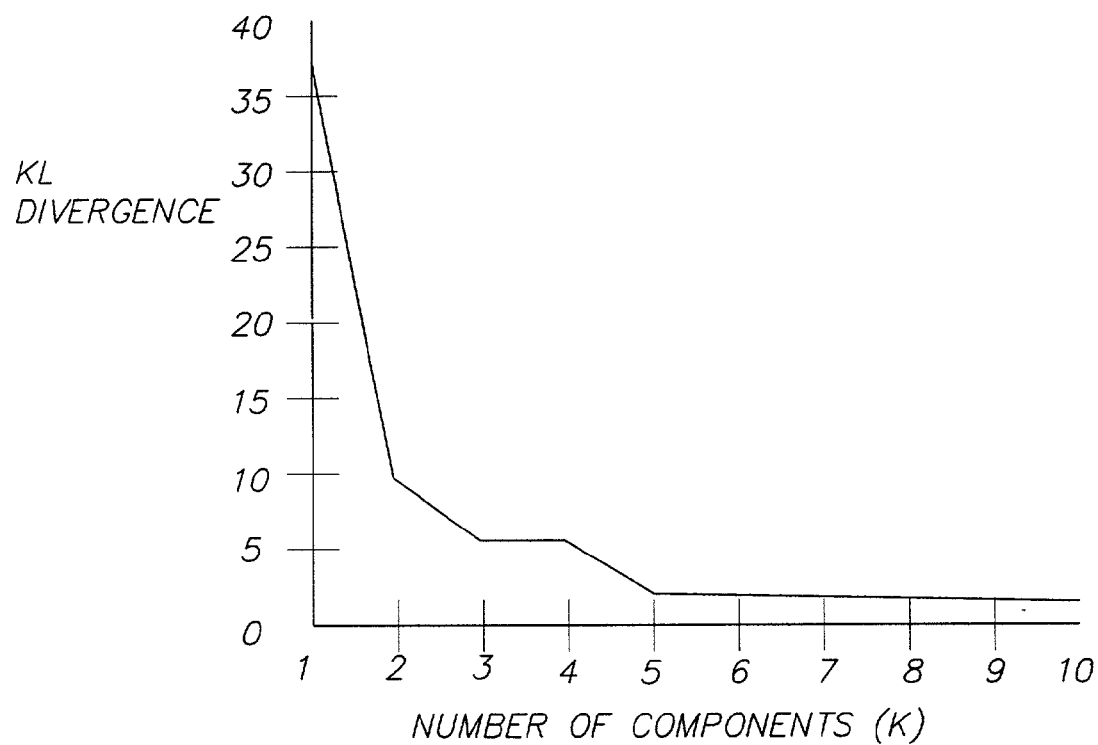
FIG. 6 shows the change in DL Divergence as the number of components are increased.

As per the proposed method, the first estimate of the model density is obtained by fitting the first Gaussian at the highest mode of the histogram, and the KLD between the color histogram and the model density is computed. Again, a new density is computed by fitting one more Gaussian on the next highest mode of the histogram and mixing the two Gaussian as per equation (2). The mixing parameters have been assumed to be uniform. As per the above formulation, as the number of Gaussians are increased, KL divergence decreases and it will either stabilize or start increasing when the number of Gaussians grow beyond the natural regions represented in the image depending on how smooth the color histogram is. For the color image shown in FIG. 2, the color histogram in g-RGB space is given in FIG. 5. FIG. 6 shows the changes in KL Divergence when the number of components (or Gaussians), K are increased. As K is increased from 1 to 2, sharp decrease in KLD can be noticed. After K=5, the KLD almost stabilizes indicating the non-significance of further increments in K. Hence, we have chosen 5 as the number of clusters in the original image. Intuitively, one can observe five broad categories in the input image i.e., sky, water, red wall, floor/skin and tree.

Parameter Estimation

Once the number of clusters has been ascertained, next step is to estimate the parameters of the model given in equations (2) and (3), i.e., mean $\mu_j$ and covariance matrix $C_j$ for cluster j, and the mixing parameters P(j) for j=1, . . . , K. The traditional Maximum Likelihood (ML) approach is used to estimate these parameters. The maximum likelihood solution yields highly non-linear coupled equations which cannot be solved simultaneously. So we need an iterative technique to solve these equations. The preferred embodiment uses Expectation-Maximization (EM), first suggested by Dempster et al. (Dempster, A., Laird, N. and Rubin, D., "Maximum Likelihood from Incomplete Data Via the EM Algorithm", *J. Royal Statistical Soc.*, Ser. B, vol. 39, No. 1, pp. 1–38, 1977, which is incorporated herein by reference), as the optimization technique to find the parameters that maximize the likelihood. EM has been used widely for problems with incomplete data. In EM optimization, the E-step is equivalent to finding a lower bound g(θ) that touches the likelihood function on the current guess of parameters $\theta^{old}$, and the M-step is equivalent to finding the new parameter values $\theta^{new}$ that maximize this lower bound.

If $x_i$ denotes the data associated with the $i^{th}$ pixel and there are n pixels in the image, the iterative equations used for EM are given by, $$\mu_j^{new} = \frac{\sum_{i=1}^{n} x_i P^{old}(j/x_i)}{\sum_{j=1}^{n} P^{old}(j/x_i)} \quad \text{(Eq. 7)}$$

$$C_j^{new} = \frac{\sum_{i=1}^{n} P^{old}(j/x_i)(x_i - \mu_j^{new})(x_i - \mu_j^{new})^T}{\sum_{i=1}^{n} P^{old}(j/x_i)} \quad \text{(Eq. 8)}$$

$$P^{new}(j) = \frac{1}{n}\sum_{i=1}^{n} P^{old}(j/x_i) \quad \text{(Eq. 9)}$$

where all the terms except $P(j/x_i)$ have been defined earlier in equations (2) and (3). $P(j/x_i)$ is the posterior probability which indicates the probability of $i^{th}$ pixel belonging to cluster j. The posterior probability is computed using Bayes rule as, $$p^{old}(j/x_i) = \frac{p^{old}(x_i/j)P^{old}(j)}{\sum_{j=1}^{K} p^{old}(x_i/j)P^{old}(j)} \quad \text{(Eq. 10)}$$

where the conditional densities $p(x_i/j)$ are obtained using equation (3). The posterior probabilities given by equation (10) form the main results of the unsupervised learning. For each cluster j, the posterior probabilities are computed for each image pixel and the map showing these probabilities is called a cluster probability map 26 (see FIG. 1). These maps for five clusters in the original image (FIG. 2) are given in FIG. 7.

In these cluster probability maps, a brighter pixel indicates a higher probability. It is clear from FIG. 7, that different clusters have captured the similarity in pixels belonging to different semantic classes. In increasing order of j, the maps broadly represent grass, red wall, sky, floor and water. However, several deficiencies can be seen in the cluster maps. Especially, the semantic classes that represent relatively small regions have been merged with other clusters, e.g. skin regions were merged with red wall or floor. There is some intuitively obvious misclustering e.g., for j=1, parts of sky, water and swimming costume have been clustered along with the grass class. However, it should be emphasized that at this stage the algorithm has no notion of a semantic class. The results of probabilistic clustering are purely based on the 'similarity' of the data points. The main aim of unsupervised learning was not to obtain perfect clustering but to obtain a probabilistic estimate of cohesiveness in various pixels, which can be later used for refining the results of supervised learning.

Supervised Learning

In the present embodiment of the invention, supervised learning 16 (see FIG. 1) has been used for assigning each image pixel a probability of association with every semantic class belonging to the recognition vocabulary. In our current example, the vocabulary contains five classes i.e., sky, water, sand/soil, skin and grass/tree. The term 'supervised' is derived from the fact that labeled training data is used. A generative approach is taken to obtain probabilities of association between a pixel and a class. In a generative approach, it is assumed that data belonging to each class comes from a true but unknown probability distribution. Mixture models are used to represent the density of data belonging to different classes.

Mixture Model

Figure 8:
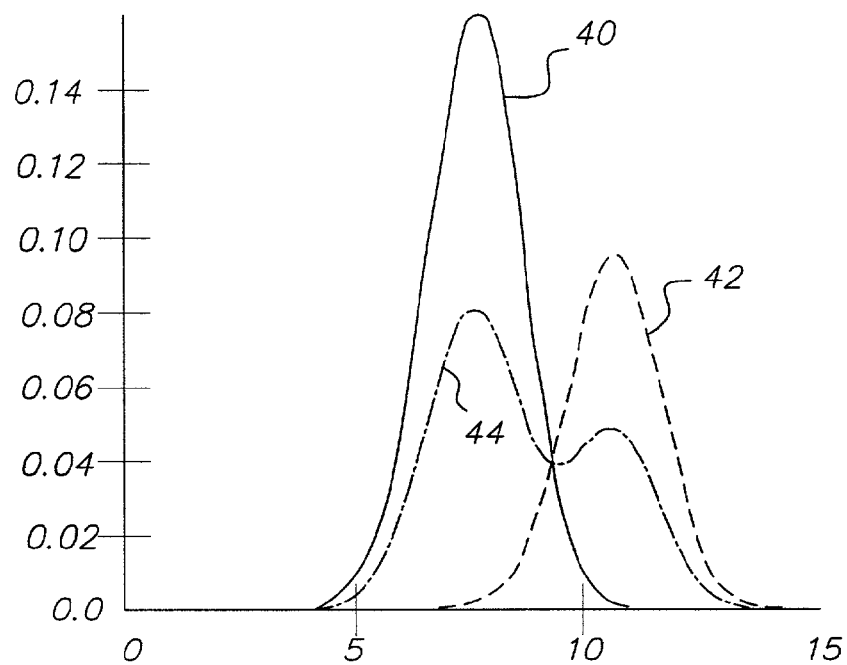
FIG. 8 shows a mixture example of a Gaussian for a "sky" class.

Mixture models belong to the semi-parametric class of models, which combine the advantages of both parametric and nonparametric models. Unlike parametric models, mixture models are not restricted to any functional form and unlike the nonparametric models, the size of a mixture model grows with the complexity of the problem being solved, not simply with the size of the data set. An important property of the mixture models is that, for many choices of component density function, they can approximate any continuous density to arbitrary accuracy provided the model has sufficiently large number of components and the parameters of the model are chosen correctly (see Bishop, C. M., *Neural Networks for Pattern Recognition*, Oxford University Press, 1995). The mixture model in the present embodiment of the invention is a mixture of Gaussians. Mixture models can capture significant inherent variations (i.e., multimodality) in the data belonging to the same semantic class. An intuitive justification of mixture model can be seen in FIG. 8. Suppose one is training for the data belonging to the class 'sky'. The pixels belonging to clear blue sky look quite similar and may be represented with a Gaussian 40. However, the sky pixels belonging to white cloudy regions may require another Gaussian blob 42 to represent the similar cloudy pixels. Thus, the pixels belonging to the sky class can be generated by mixing the two blobs, yielding a mixture density 44. The red curve shows the mixture of two Gaussians. The example uses just two Gaussians, but in practice more may be needed depending on the data. It should be noted that all the parameters of the model including number of Gaussians required to capture the inherent variations in a class are learnt automatically from the training data.

According to the mixture of Gaussian model, the class conditional density is given by, $$p(y/\omega) = \sum_{m=1}^{M} p(y/m, \omega) P(m/\omega) \qquad \text{(Eq. 11)}$$

where y is a data point belonging to the training set of class $\omega$ and M is the number of gaussians (or components). As per this model, each data point y belonging to class $\omega$ is generated by first choosing a Gaussian component with probability $P(m/\omega)$ and then generating the data point with probability $p(x/m, \omega)$ which is a gaussian given by, $$p(x/m, \omega) = \frac{1}{|2\pi C_m|^{1/2}} \exp\left\{-\frac{1}{2}(x-\mu_m)^T C_m^{-1}(x-\mu_m)\right\} \qquad \text{(Eq. 12)}$$

where $\mu_m$ is the mean and $C_m$ is the covariance matrix for component m. There are two main issues to be addressed to learn the density given in equation (11), i.e., How many components are required to learn the density of a given class (component selection).

What are the density parameters: $P(m/\omega)$, mean and covariance matrix for each gaussian (parameter estimation).

It may be noted that this is the identical problem solved in the unsupervised learning except that, in supervised learning, data is not the input image but the labeled training set belonging to a particular class. Accordingly, the KL Divergence based scheme is used for component selection as outlined above. All other parameters of the mixture model are learnt by using EM. Iterative equations similar to the ones given in equations (7)–(10) were used. As a brief note for the component selection, if the number of components are chosen more than a threshold, it does not do any significant harm as the EM generates a small mixing probability, i. e., $P(m/\omega)$ for extra clusters. So, if a component selection scheme can suggest such a threshold, it would suffice. Of course, the learning process slows down with the increase in number of components.

The output of the supervised learning is a class probability map 28 (see FIG. 1) for each class in the recognition vocabulary. A class probability map shows the probability of each pixel to have come from a given class, i.e. $p(x/\omega)$. A class probability map corresponding to class 'grass/tree' of input image (FIG. 2) is given in FIG. 9. A brighter pixel indicates higher probability. It can be seen that the generative model 22 has correctly classified the grass/tree regions with high probability. However, there are several non-grass areas with significant probability of being grass, e.g. parts of water, wet floor etc. Although probabilities in these regions are not very high, they have the potential of misleading the Bayesian refinement of class maps while implementing an iterative feedback scheme. Similar maps are obtained for the other classes in the recognition vocabulary.

Merging Unsupervised and Supervised Learning

The main inspiration for merging the cluster probability maps 26, obtained from unsupervised learning 14, and class probability maps 28, obtained from supervised learning 16, comes from the possibility of modification and refinement of the class probability maps. As discussed before, the cluster probability maps 26 capture the similarity of various pixels in a single image while the class probability maps 28 capture the similarity of image pixels and the training data belonging to different classes. The class probability maps 28 are generally not perfect as the generative models are learnt from the training data and obtained from images captured under different physical conditions, e.g., variations in illumination. Thus, it might happen that some of the pixels in a given image might look 'close' to the training data of a particular class even though the pixels actually do not belong to that class. This leads to false alarms in the class probability maps. It can be seen in the class probability map for class 'grass/tree' (FIG. 9), parts of wet floor and water regions have been assigned a significant probability of being grass. So, the hope is if the concept of pixel similarity can be enforced within a single given image, it may be able to provide better class probability maps.

The first step towards merging the cluster and class probability maps 26 and 28 is to find which cluster probability maps have high probability of representing a given class. This is done by maximizing the class conditional probability given a cluster, i.e. $P(\omega_i/j)$. To compute the class posterior, first the posterior of a cluster given a class is considered as, $$p(j/\omega_i) = \int p(j, x/\omega_i) dx$$

This is from the definition of marginal distribution. Using Bayes law on the integrand in RHS, $$p(j/\omega_i) = \int p(x/\omega_i) p(j/x, \omega_i) dx$$

But in the second term of the above integrand, clustering is independent of the class given the data, i.e. $p(j/x, \omega_i)=p(j/x)$. This is the case of conditional independence. So, $$p(j/\omega_i)=\int p(x/\omega_i)p(j/\omega_i)dx$$

Since we are dealing with discrete data and the probability mass should add to one, the cluster conditional is given by, $$P(j/\omega_i) = \frac{\sum_x P(j/x)p(x/\omega_i)}{\sum_j \sum_x P(j/x)p(x/\omega_i)} \quad \text{(Eq. 13)}$$

Using equation (13), the class conditional can be computed easily from the Bayes rule, $$P(\omega_i/j) = \frac{P(j/\omega_i)P(\omega_i)}{\sum_{i=1}^{W} p(j/\omega_i)P(\omega_i)} \quad \text{(Eq. 14)}$$

As before, it is assumed the class priors $P(\omega_i)$ to be uniform.

Figure 9:
FIG. 9 shows a class probability map for the input image shown in FIG. 2.

The posterior probabilities of different classes given a cluster have been plotted. FIG. 10(a)–(e) gives the plots corresponding to five cluster probability maps. It is clear from the plots that cluster j=1 has much higher probability of being from class 'grass/tree' than the other four classes. Also, this is the only cluster that has high 'grass/tree' probability. So, the cluster probability map corresponding to j=1 (FIG. 7(a)) is used to refine the class probability map for class 'grass/tree' (FIG. 9). This correspondence between the chosen class and cluster probability maps is obvious. It should be mentioned that there might be more than one cluster, which could correspond to the same class depending on how the clustering was done. This scenario can be easily included in the modification scheme of the class probability map.

Figure 11:
FIG. 11 shows a modified class probability map for the class probability map shown in FIG. 9.
Figure 10A:
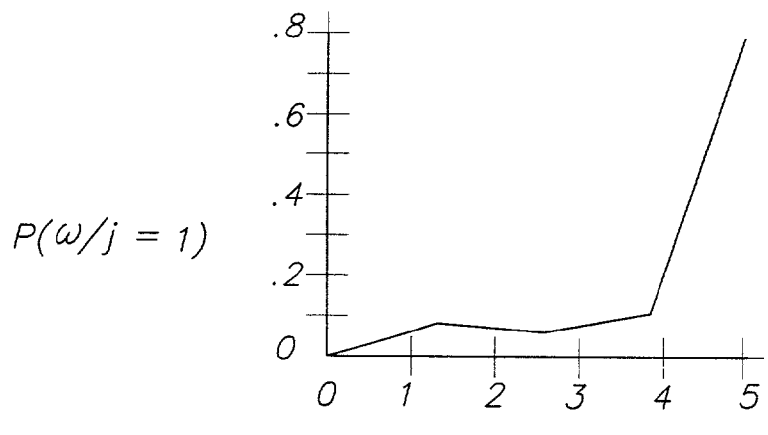
FIGS. 10(a)–(e) show the posterior probability for the five cluster probability maps shown in FIGS. 7(a)–(e).
Figure 10B:
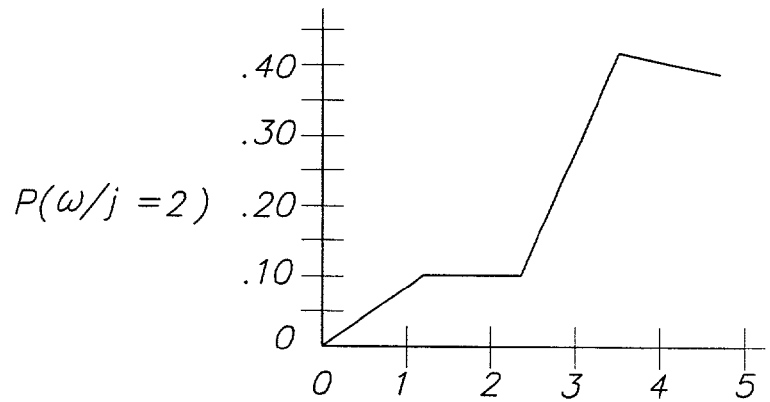
Figure 10C:
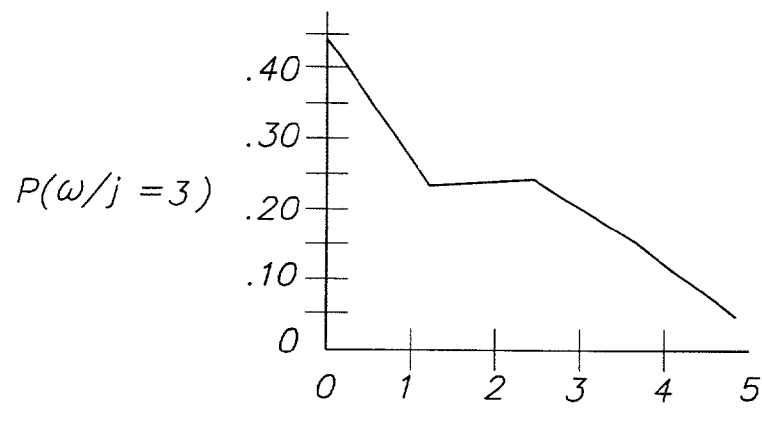
Figure 10D:
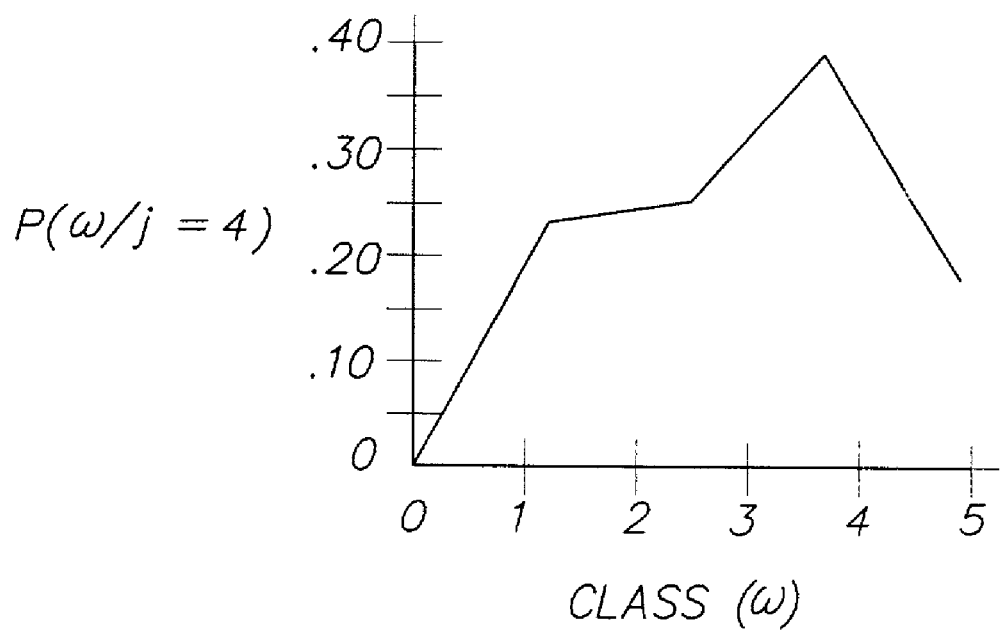
Figure 10E:
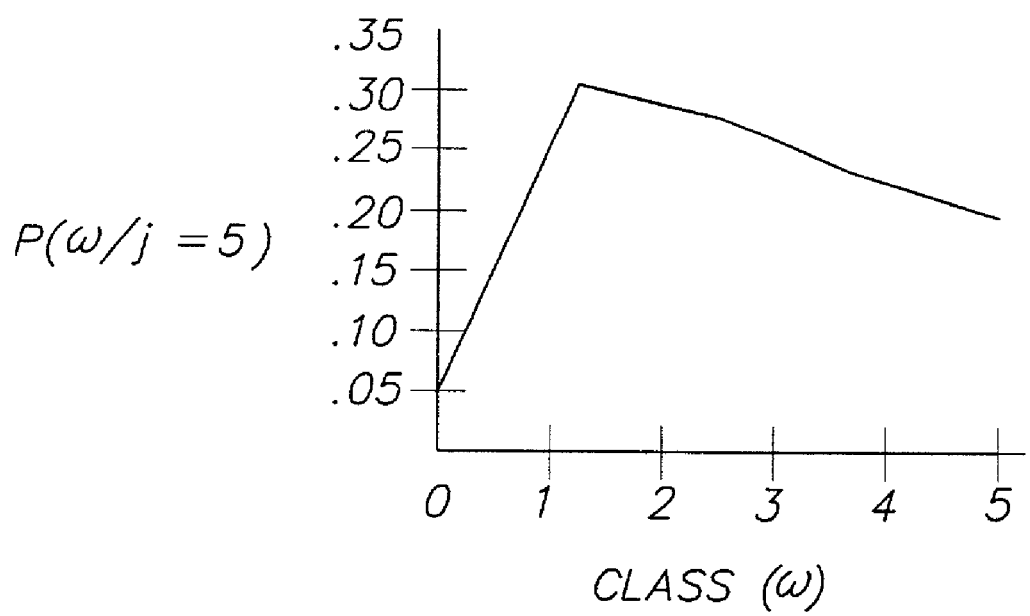

Once a cluster (or clusters) corresponding to a class has been chosen, the modified class probability map 30 is computed by weighting each pixel probability of the class probability map by the corresponding pixel probability of the cluster probability map. The modified class probability map of class 'grass/tree' is given in FIG. 11. The probabilities of false grass regions, e.g., parts of floor, water and skin, have been significantly reduced. In case more than one cluster corresponds to the same class, the modified maps using each cluster are merged using the mixing ratio given by mixing parameters P(j) learnt by EM during unsupervised learning.

Figure 12:
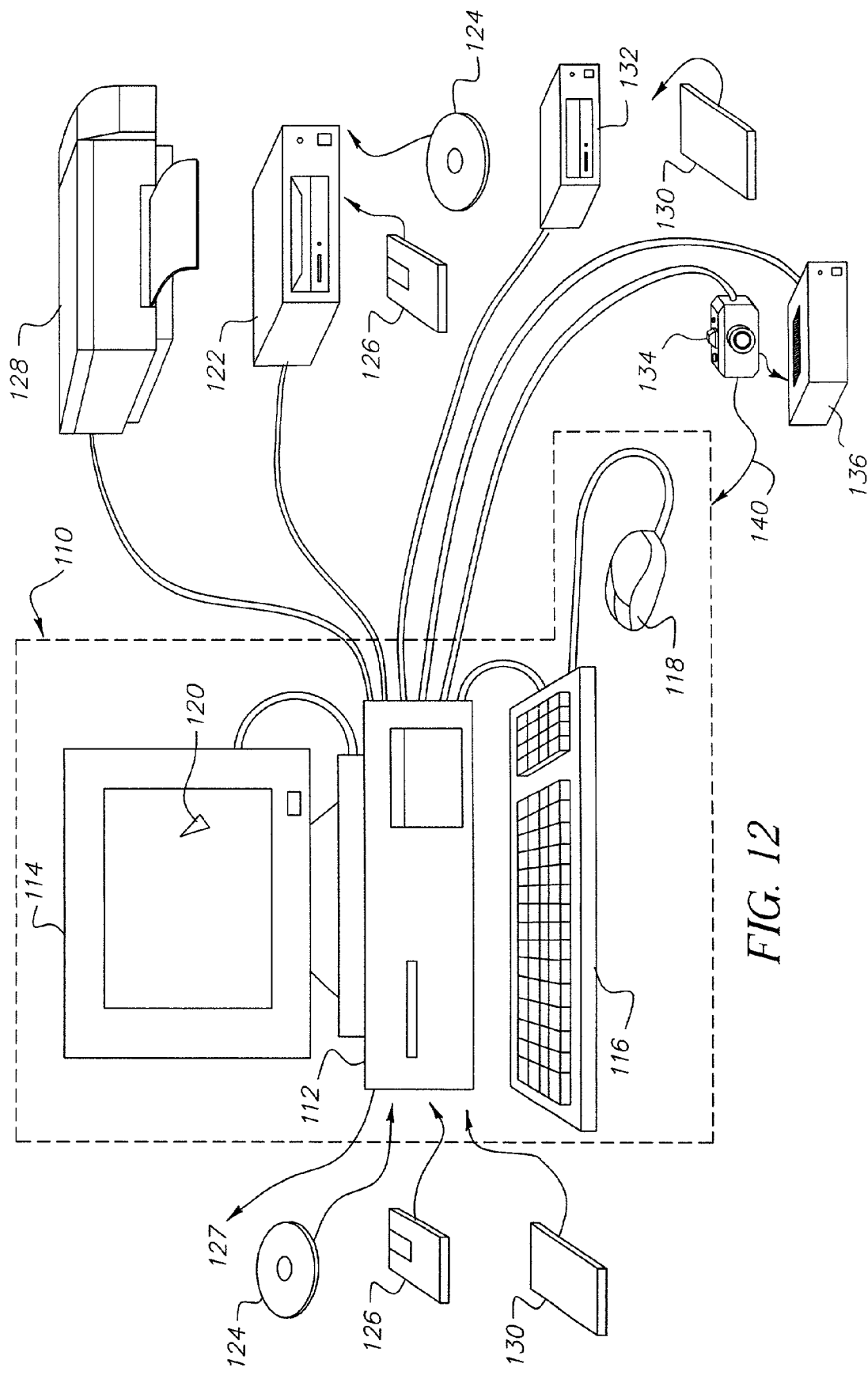
FIG. 12 is a perspective diagram of a computer system for implementing the present invention.

Referring to FIG. 12, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting the software programs and other information to the microprocessor based unit 112 via a compact disk 124, which typically includes a software program. In addition, a floppy disk 126 may also include a software program, and is inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera 134 or a scanner 136 (for example, by scanning an original, such as a silver halide film). The digital camera 134 may also download images to the computer system through a communications link 140 (e.g., an RF or IR link). In accordance with the invention, the algorithm may be stored in any of the storage devices heretofore mentioned and applied to images in order to process and classify the images.

The invention has been described with reference to a preferred embodiment. However, it will be appreciated that variations and modifications can be effected by a person of ordinary skill in the art without departing from the scope of the invention.

PARTS LIST 10 input color image
12 feature extraction stage
14 unsupervised learning stage
16 supervised learning stage
18 component selection stage
20 clustering algorithm
22 generative model
24 labeled training data
26 cluster probability map
28 class probability map
30 modified class probability map
40 clear blue sky Gaussian
42 cloudy sky Gaussian
44 mixture density
110 computer system
112 microprocessor-based unit 114 display
116 keyboard
118 mouse
120 selector
122 CD-ROM
124 compact disk
126 floppy disk
127 network connection
128 printer
130 PC card
132 card reader
134 digital camera
136 scanner
140 communications link

What is claimed is:

1. A method for classification of image regions by probabilistic merging of a class probability map and a cluster probability map, said method comprising the steps of:
   a) extracting one or more features from an input image composed of image pixels;
   b) performing unsupervised learning based on the extracted features to obtain a cluster probability map of the image pixels;
   c) performing supervised learning based on the extracted features to obtain a class probability map of the image pixels; and
   d) combining the cluster probability map from unsupervised learning and the class probability map from supervised learning to generate a modified class probability map to determine the semantic class of the image regions;
   wherein the unsupervised learning in step b) comprises the steps of:
   determining number of clusters in the input image;
   estimating parameters of a probabilistic model describing the clusters; and
   assigning each image pixel to one of the clusters according to the probabilistic model.

2. The method as claimed in claim 1 wherein the extracted features include color and textual features.

3. The method as claimed in claim 1 wherein step a) comprises the step of extracting and computing low-level features selected from the group including color, texture, shapes, and wavelet coefficients from the input image.

4. The method as claimed in claim 1 wherein step a) comprises the step of detecting and extracting semantic-level features selected from the group including faces, people, and structures from the input image.

5. A computer program product for classification of image regions by probabilistic merging of a class probability map and a cluster probability map comprising: a computer readable storage medium having a computer program stored thereon for performing the steps of claim 1.

6. A method for classification of image regions by probabilistic merging of a class probability map and a cluster probability map, said method comprising the steps of:
   a) extracting one or more features from an input image composed of image pixels;
   b) performing unsupervised learning based on the extracted features to obtain a cluster probability map of the image pixels;
   c) performing supervised learning based on the extracted features to obtain a class probability map of the image pixels; and
   d) combining the cluster probability map from unsupervised learning and the class probability map from supervised learning to generate a modified class probability map to determine the semantic class of the image regions;
   wherein the supervised learning of step c) comprises the steps of:
   creating a labeled training set belonging to a particular class;
   determining a number of components required to learn a density function of a given class with the labeled training set as input;
   estimating parameters of each density function in a mixture model; and
   assigning each image pixel to one of the classes according to the mixture model.

7. The method as claimed in claim 6 wherein the extracted features include color and textual features.

8. The method as claimed in claim 6 wherein step a) comprises the step of extracting and computing low-level features selected from the group including color, texture, shapes, and wavelet coefficients from the input image.

9. The method as claimed in claim 6 wherein step a) comprises the step of detecting and extracting semantic-level features selected from the group including faces, people, and structures from the input image.

10. A computer program product for classification of image regions by probabilistic merging of a class probability map and a cluster probability map comprising: a computer readable storage medium having a computer program stored thereon for performing the steps of claim 6.

11. A method for classification of image regions by probabilistic merging of a class probability map and a cluster probability map, said method comprising the steps of:
   a) extracting one or more features from an input image composed of image pixels;
   b) performing unsupervised learning based on the extracted features to obtain a cluster probability map of the image pixels;
   c) performing supervised learning based on the extracted features to obtain a class probability map of the image pixels; and
   d) combining the cluster probability map from unsupervised learning and the class probability map from supervised learning to generate a modified class probability map to determine the semantic class of the image regions;
   wherein the unsupervised learning of step b) comprises the steps of:
   determining a number of clusters in the input image using a Kullback-Leibler (KL) divergence method;
   estimating mean and covariance parameters of a normally distributed probabilistic model describing the clusters using an Expectation-Maximization (EM) technique; and
   assigning each image pixel to one of the clusters according to the normally distributed probabilistic model by computing a posterior probability using Bayes rule.

12. The method as claimed in claim 11 wherein the extracted features include color and textual features.

13. The method as claimed in claim 11 wherein step a) comprises the step of extracting and computing low-level features selected from the group including color, texture, shapes, and wavelet coefficients from the input image.

14. The method as claimed in claim 11 wherein step a) comprises the step of detecting and extracting semantic-level features selected from the group including faces, people, and structures from the input image.

15. A computer program product for classification of image regions by probabilistic merging of a class probability map and a cluster probability map comprising: a computer readable storage medium having a computer program stored thereon for performing the steps of claim 11.

16. A method for classification of image regions by probabilistic merging of a class probability map and a cluster probability map, said method comprising the steps of:
 a) extracting one or more features from an input image composed of image pixels;
 b) performing unsupervised learning based on the extracted features to obtain a cluster probability map of the image pixels;
 c) performing supervised learning based on the extracted features to obtain a class probability map of the image pixels; and
 d) combining the cluster probability map from unsupervised learning and the class probability map from supervised learning to generate a modified class probability map to determine the semantic class of the image regions;
 wherein the supervised learning of step c) comprises the steps of:
  creating a labeled training set belonging to a particular class;
  determining a number of components required to learn a density function of a given class with the labeled training set as input, using a Kullback-Leibler (KL) divergence method;
  estimating the mean and covariance parameters of each density function in a Gaussian mixture model using an Expectation-Maximization (EM) technique; and
  assigning each image pixel to one of the classes according to the Gaussian mixture model.

17. The method as claimed in claim 16 wherein the extracted features include color and textual features.

18. The method as claimed in claim 16 wherein step a) comprises the step of extracting and computing low-level features selected from the group including color, texture, shapes, and wavelet coefficients from the input image.

19. The method as claimed in claim 16 wherein step a) comprises the step of detecting and extracting semantic-level features selected from the group including faces, people, and structures from the input image.

20. A computer program product for classification of image regions by probabilistic merging of a class probability map and a cluster probability map comprising: a computer readable storage medium having a computer program stored thereon for performing the steps of claim 16.

21. A method for classification of image regions by probabilistic merging of a class probability map and a cluster probability map, said method comprising the steps of:
 a) extracting one or more features from an input image composed of image pixels;
 b) performing unsupervised learning based on the extracted features to obtain a cluster probability map of the image pixels;
 c) performing supervised learning based on the extracted features to obtain a class probability map of the image pixels; and
 d) combining the cluster probability map from unsupervised learning and the class probability map from supervised learning to generate a modified class probability map to determine the semantic class of the image regions;
 wherein step d) comprises the steps of:
  maximizing a joint likelihood of class and cluster by computing a class conditional probability using Bayes rule;
  assigning each of the cluster probability maps to one of the classes according to the class conditional probability; and
  computing the modified class probability map by weighting each pixel probability of the class probability map by the corresponding pixel probability of the cluster probability map.

22. The method as claimed in claim 21 wherein the extracted features include color and textual features.

23. The method as claimed in claim 21 wherein step a) comprises the step of extracting and computing low-level features selected from the group including color, texture, shapes, and wavelet coefficients from the input image.

24. The method as claimed in claim 21 wherein step a) comprises the step of detecting and extracting semantic-level features selected from the group including faces, people, and structures from the input image.

25. A computer program product for classification of image regions by probabilistic merging of a class probability map and a cluster probability map comprising: a computer readable storage medium having a computer program stored thereon for performing the steps of claim 21.

* * * * *